(12) United States Patent
Gatto et al.

(10) Patent No.: US 9,332,081 B2
(45) Date of Patent: May 3, 2016

(54) ANONYMOUS CROSS-DEVICE LINKING USING TEMPORAL IDENTIFIERS

(71) Applicant: Google Inc., Mountain View, CA (US)

(72) Inventors: Vincent Gatto, Sunnyvale, CA (US); Venu Vemula, San Ramon, CA (US); Daniil Khidekel, Berkeley, CA (US); Lukasz Bieniasz-Krywiec, Sunnyvale, CA (US); Sissie Ling-Ie Hsiao, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 14/015,515

(22) Filed: Aug. 30, 2013

(65) Prior Publication Data

US 2015/0067118 A1    Mar. 5, 2015

(51) Int. Cl.
*H04L 29/08*    (2006.01)
*G06Q 30/02*    (2012.01)

(52) U.S. Cl.
CPC ............ *H04L 67/22* (2013.01); *G06Q 30/0241* (2013.01)

(58) Field of Classification Search
CPC ....... H04L 67/00; H04L 63/06; H04L 63/068; H04L 67/22; G06Q 30/0241
See application file for complete search history.

(56) References Cited

U.S. PATENT DOCUMENTS

| | | | |
|---|---|---|---|
| 7,873,734 B1* | 1/2011 | Eidelman et al. | 709/227 |
| 8,606,873 B2* | 12/2013 | Park et al. | 709/207 |
| 8,688,984 B2* | 4/2014 | Rajkumar et al. | 713/168 |
| 2002/0010776 A1* | 1/2002 | Lerner | 709/225 |
| 2006/0020782 A1* | 1/2006 | Kakii | 713/156 |
| 2006/0098795 A1* | 5/2006 | Choti et al. | 379/114.14 |
| 2008/0028206 A1* | 1/2008 | Sicard et al. | 713/156 |
| 2008/0172373 A1* | 7/2008 | Jenson et al. | 707/5 |
| 2008/0172422 A1* | 7/2008 | Li et al. | 707/202 |
| 2008/0289019 A1* | 11/2008 | Lam | 726/9 |
| 2009/0007217 A1* | 1/2009 | Birger et al. | 726/1 |
| 2009/0327391 A1* | 12/2009 | Park et al. | 709/201 |
| 2010/0017596 A1* | 1/2010 | Schertzinger | 713/155 |
| 2010/0057843 A1* | 3/2010 | Landsman et al. | 709/203 |
| 2010/0287288 A1* | 11/2010 | Driscoll et al. | 709/229 |
| 2010/0319056 A1* | 12/2010 | Gillum et al. | 726/5 |
| 2011/0082824 A1* | 4/2011 | Allison et al. | 706/20 |
| 2011/0246267 A1* | 10/2011 | Williams et al. | 705/14.4 |
| 2012/0078708 A1* | 3/2012 | Taylor et al. | 705/14.41 |

(Continued)

FOREIGN PATENT DOCUMENTS

| | | |
|---|---|---|
| JP | 2012084085 | 4/2012 |
| WO | 2013/052004 | 4/2013 |

*Primary Examiner* — Joseph P Hirl
*Assistant Examiner* — J. Brant Murphy
(74) *Attorney, Agent, or Firm* — Fish & Richardson P.C.

(57) ABSTRACT

Methods, systems, and apparatus include computer programs encoded on a computer-readable storage medium, including a method for providing content. Login credentials provided by a user are received when communicating through a first user device, and a temporal identifier is created for the user and provided to the first user device. Prior to expiration of the temporary key, login credentials provided by the user on a second different user device are received. The temporal identifier is re-created for the user and provided to the second different user device. A first request is received from the first or second different user device. The temporal identifier is stored and an identifier associated with the device. A second request is received from the other device. A device identifier for the first and second different user device are linked in association with the temporal identifier. The linking is used to respond to the second request.

18 Claims, 7 Drawing Sheets

(56) References Cited

U.S. PATENT DOCUMENTS

| | | | |
|---|---|---|---|
| 2012/0167185 A1* | 6/2012 | Menezes et al. | 726/5 |
| 2012/0203639 A1* | 8/2012 | Webster | G06Q 30/0269 705/14.66 |
| 2012/0210413 A1* | 8/2012 | Akula et al. | 726/8 |
| 2012/0323686 A1* | 12/2012 | Burger et al. | 705/14.55 |
| 2013/0110623 A1* | 5/2013 | Kilroy et al. | 705/14.53 |
| 2013/0138957 A1* | 5/2013 | Dharmarajan et al. | 713/168 |
| 2013/0212188 A1* | 8/2013 | Duterque | G06Q 30/0201 709/206 |
| 2014/0019752 A1* | 1/2014 | Yin | H04L 63/0435 713/155 |
| 2014/0020073 A1* | 1/2014 | Ronda et al. | 726/7 |
| 2014/0281533 A1* | 9/2014 | de Andrade et al. | 713/168 |
| 2014/0282665 A1* | 9/2014 | Arini | 725/18 |

\* cited by examiner

ANONYMOUS CROSS-DEVICE LINKING USING TEMPORAL IDENTIFIERS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can then be provided to the user on any devices associated with the user such as a home personal computer (PC), a smartphone, a laptop computer, or some other user device.

SUMMARY

In general, one innovative aspect of the subject matter described in this specification can be implemented in methods that include a computer-implemented method for providing content. The method includes receiving login credentials provided by a user when communicating through a first user device. The method further includes creating a temporal identifier for the user based at least in part on the login credentials and a temporary key. The method further includes providing the temporal identifier to the first user device in the form of a cookie. The method further includes, subsequently, but prior to an expiration of the temporary key, receiving login credentials provided by the user when communicating through a second different user device. The method further includes re-creating the temporal identifier for the user based at least in part on the login credentials and the temporary key. The method further includes providing the temporal identifier to the second different user device in the form of a cookie. The method further includes receiving a first request from one device of the first user device or the second different user device including receiving the temporal identifier. The method further includes storing the temporal identifier and an identifier associated with the one device. The method further includes subsequently receiving a second request from another of the first user device or the second different user device including receiving the temporal identifier. The method further includes linking a device identifier for the first user device and second different user device in association with the temporal identifier based on the received second request. The method further includes using the linking to respond to the second request or to perform another action.

In general, another innovative aspect of the subject matter described in this specification can be implemented in methods that include a computer-implemented method for providing content. The method includes registering a user in association with a first device including creating a temporal identifier based at least in part on login credentials provided by the user and a temporary key, and providing the temporal identifier for storage at the first device. The method further includes subsequently registering the user in association with a second different device including regenerating the temporal identifier and providing the temporal identifier for storage on the second different device. The method further includes receiving a request from a device wherein the request includes the temporal identifier. The method further includes storing the temporal identifier and a device identifier associated with the device that generated the request. The method further includes subsequently receiving a second request from a second different device wherein the second request includes the temporal identifier. The method further includes linking the first device and the second different device using the temporal identifier and in response to the second request. The method further includes using the linking to respond to the second request or to perform another action.

These and other implementations can each optionally include one or more of the following features. Registering the user can further include receiving the login credentials from the user. The temporary key can have a predetermined expiration, and subsequently registering the user can include determining whether the predetermined expiration has occurred, and when not, recreating the temporal identifier using the login credentials and the temporary key. Creating the temporal identifier can further creating the temporal identifier based at least in part on an identifier assigned to a user associated with the login credentials. Storing the temporal identifier can further storing the temporal identifier and the device identifiers in a data structure that is indexed by the temporal identifier. Only one of the first device or second different device may be a mobile device. The first request can be received from the first device, and the second request can be received from the second different device. Using the linking can include using the linking for one or more of cross-device conversion tracking, cross-device frequency capping, or content selection. Using the linking can include using the linking to select content to deliver to the user in response to the second request. The temporal identifier can include an anonymous tinyhash for differentiating multiple users of a shared device, and the anonymous tinyhash can be unique to a particular one of the multiple users.

In general, another innovative aspect of the subject matter described in this specification can be implemented in computer program products that include a computer program product tangibly embodied in a computer-readable storage device and comprising instructions. The instructions, when executed by one or more processors, cause the processor to: register a user in association with a first device including creating a temporal identifier based at least in part on login credentials provided by the user and a temporary key, and provide the temporal identifier for storage at the first device; subsequently register the user in association with a second different device including regenerating the temporal identifier and provide the temporal identifier for storage on the second different device; receive a request from a device wherein the request includes the temporal identifier; store the temporal identifier and a device identifier associated with the device that generated the request; subsequently receive a second request from a second different device wherein the second request includes the temporal identifier; link the first device and the second different device using the temporal identifier and in response to the second request; and use the linking to respond to the second request or to perform another action.

These and other implementations can each optionally include one or more of the following features. Registering the user further can includes receiving the login credentials from the user. The temporary key can have a predetermined expiration, and subsequently registering the user can include determining whether the predetermined expiration has occurred, and when not, recreating the temporal identifier using the login credentials and the temporary key. Creating the temporal identifier can include creating the temporal identifier based at least in part on an identifier assigned to a user associated with the login credentials. Storing the temporal identifier can include storing the temporal identifier and the device identifiers in a data structure that is indexed by the temporal identifier.

In general, another innovative aspect of the subject matter described in this specification can be implemented in systems, including a system comprising one or more processors and one or more memory elements including instructions. The instructions, when executed, cause the one or more processors to: register a user in association with a first device including creating a temporal identifier based at least in part on login credentials provided by the user and a temporary key, and provide the temporal identifier for storage at the first device; subsequently register the user in association with a second different device including regenerating the temporal identifier and provide the temporal identifier for storage on the second different device; receive a request from a device wherein the request includes the temporal identifier; store the temporal identifier and a device identifier associated with the device that generated the request; subsequently receive a second request from a second different device wherein the second request includes the temporal identifier; link the first device and the second different device using the temporal identifier and in response to the second request; and use the linking to respond to the second request or to perform another action.

These and other implementations can each optionally include one or more of the following features. Registering the user further can includes receiving the login credentials from the user. The temporary key can have a predetermined expiration, and subsequently registering the user can include determining whether the predetermined expiration has occurred, and when not, recreating the temporal identifier using the login credentials and the temporary key. Storing the temporal identifier can include storing the temporal identifier and the device identifiers in a data structure that is indexed by the temporal identifier.

Particular implementations may realize none, one or more of the following advantages. Content sponsors can specify that campaigns (e.g., advertising campaigns) are to gather and use information about linked devices for the same user to perform cross-device conversion tracking, cross-device frequency capping, and/or content selection. Users who optionally allow their devices to be linked can receive content that is more interesting and relevant.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
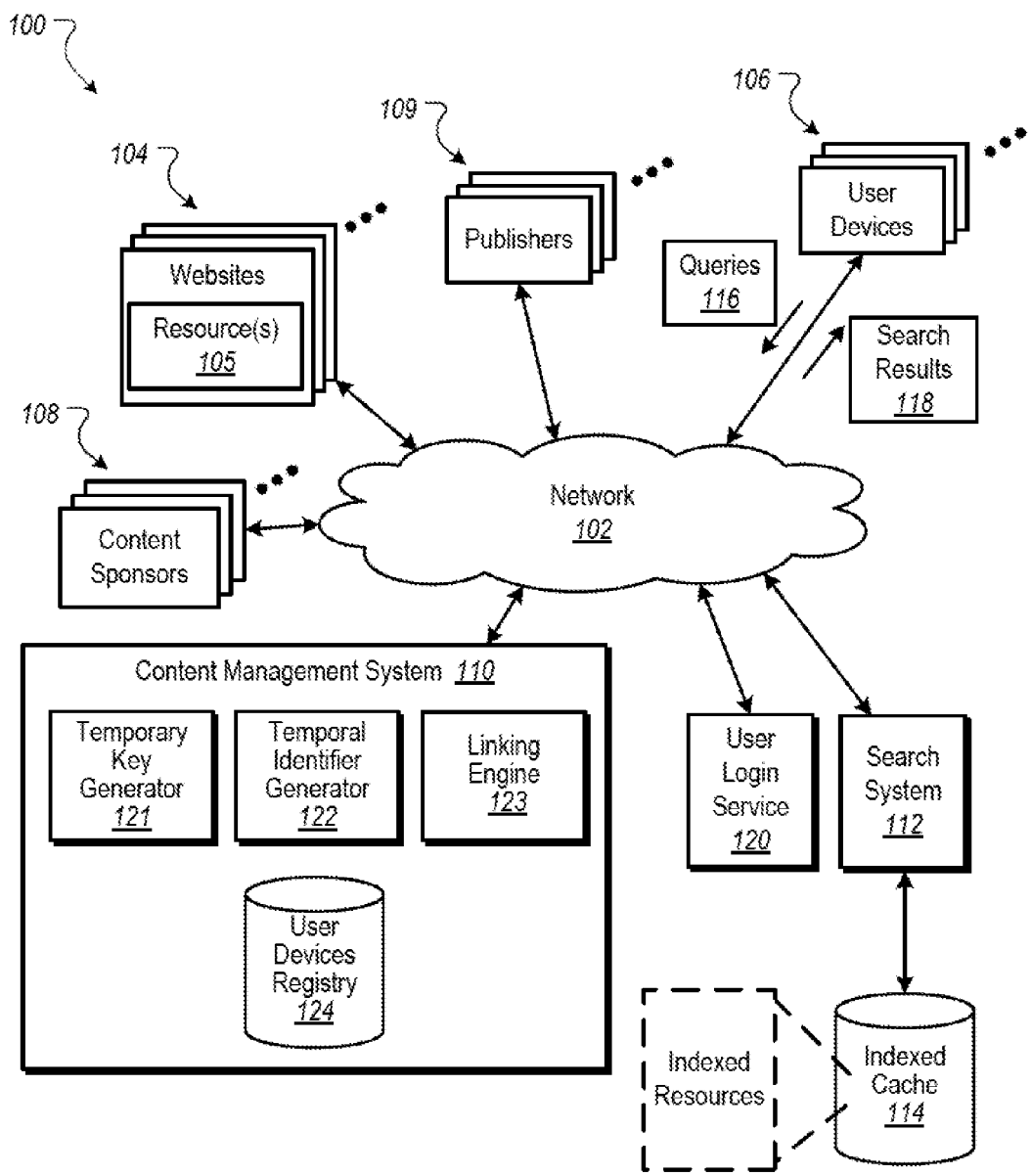
FIG. 1 is a block diagram of an example environment for delivering content.

This document describes methods, processes and systems for using temporal identifiers to link multiple devices associated with a user, and using the linking to perform an action. For example, when a user logs into a user service from a first device (e.g., the user's home PC), a system can determine a temporal identifier using the user's login credentials and a computed temporary key (e.g., ephemeral key). The temporal identifier can be stored on the first device, e.g., for later use in making requests for content. Subsequently, when the user logs into the user service from a second different device (e.g., the user's smartphone), the temporal identifier can be re-generated using the user's login credentials and the temporary key. The same temporal identifier can be stored on the second different device, e.g., for later use in making requests for content. The temporal key can have a predetermined expiration, such that requests that are received (even from the same user) will not produce the temporal identifier once the expiration has occurred. Subsequently, one of the user's devices (e.g., the user's home PC) can send a request for content, such as when the user is using a browser or is on a web page that requests content. The request can include a copy of the temporal identifier stored on the user's device. Upon receipt of the request, the system can store the temporal identifier with an identifier for the particular device of the user (e.g., the user's home PC). Another one of the user's devices (e.g., the user's smartphone) can send a request for content, e.g., when the user is using a browser or is on a web page that requests content. The request can include a copy of the temporal identifier stored on the user's device. Upon receipt of the request, the system can associate an identifier for the particular device of the user (e.g., the user's smartphone) with the device identified to be associated with the temporal identifier (e.g., the user's home PC). The user's devices can be linked based on the stored temporal identifier.

In some implementations, each temporal identifier is anonymous and cannot be used to determine, for example, the identity of the user from whom the temporal identifier is produced. For example, each temporal identifier can be generated from a one-way hash of the user's login credentials in combination with a temporary key (e.g., ephemeral key). Temporal identifiers are also temporal, e.g., the temporary identifier may be produced only for a limited period of time, such as to enable a user to join user devices within a predetermined time period.

Information about linked devices for a given user can be used in different ways, such as in cross-device conversion tracking, cross-device frequency capping, selection of content, or in other ways. In conversion tracking, for example, a conversion on the user's second different device can be tracked to (e.g., associated with) presentation of content on the user's first device. In frequency capping, for example, impressions of content items presented to a user can be capped across all of the user's linked devices. In an example involving the selection of content, the system can select content to present to a user's second different device based on information regarding the user (e.g., profile information) and the presentation of content on other linked devices.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, the example environment 100 further includes a user login service 120 that can provide, for any particular user, access to the user's Web services, e-mail, social networks, business applications or other resources. For example, the user login service 120 can receive login requests from the user, such as through a Web browser or other application running on any device associated with the user. The login request can include, for example, the user's login ID (e.g., a unique identifier, an email address, a phone number, or any other identifier for the user that can be used for verifying the user at login).

In some implementations, the content management system 110 includes plural engines. A temporary key generator 121, for example, can generate the temporary key, such as a random ephemeral key or other key that can be used to generate temporal identifiers. A temporal identifier generator 122 can generate a temporal identifier, for example, based on information from a user's login credentials and the temporary key (e.g., ephemeral key). In some implementations, the temporal identifier is anonymous (e.g., not usable to derive a user identifier). The temporal identifier that is generated and re-generated for the same user within a particular time period is the same, and this equality is used to establish a linking of the devices associated with a user. A linking engine 123 can be used to look up information about linked devices for a particular user, e.g., based on linked device information stored in a user devices registry 124. Each entry in the user devices registry 124 can include, for example, a temporal identifier and one or more device identifiers. Linking can be realized, for example, by indexing the user devices registry 124 using temporal identifiers. In this example each entry includes the one or more devices that share a given temporal identifier. Alternatively, the user devices registry 124 can include plural entries, with each entry only including a temporal identifier and a single identifier for a device from which the temporal identifier was received. In this second example, entries having the same temporal identifier can represent the linking of the corresponding devices (e.g., two or more of user devices 106 associated with a user). Given a first user device for a particular user, for example, the linking engine 123 can look up additional devices that are linked to the first device.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals. Other information, such as user identifier information that is associated with the linkings described above, can be used and/or evaluated when selecting eligible content.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, determining that a conversion has occurred can be facilitated using information about a user's linked user devices 106. For example, after a content item (e.g., an advertisement) is presented to a user on a first device (e.g., the user's home PC), information about the user's linked devices can be used to determine that a conversion has later occurred for the same user on a different device (e.g., the user's smartphone).

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). For example, users can have the opportunity to control whether or not certain ones of their devices are linked and/or how the linking is used. In addition, certain data may be anonymized in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 2A:
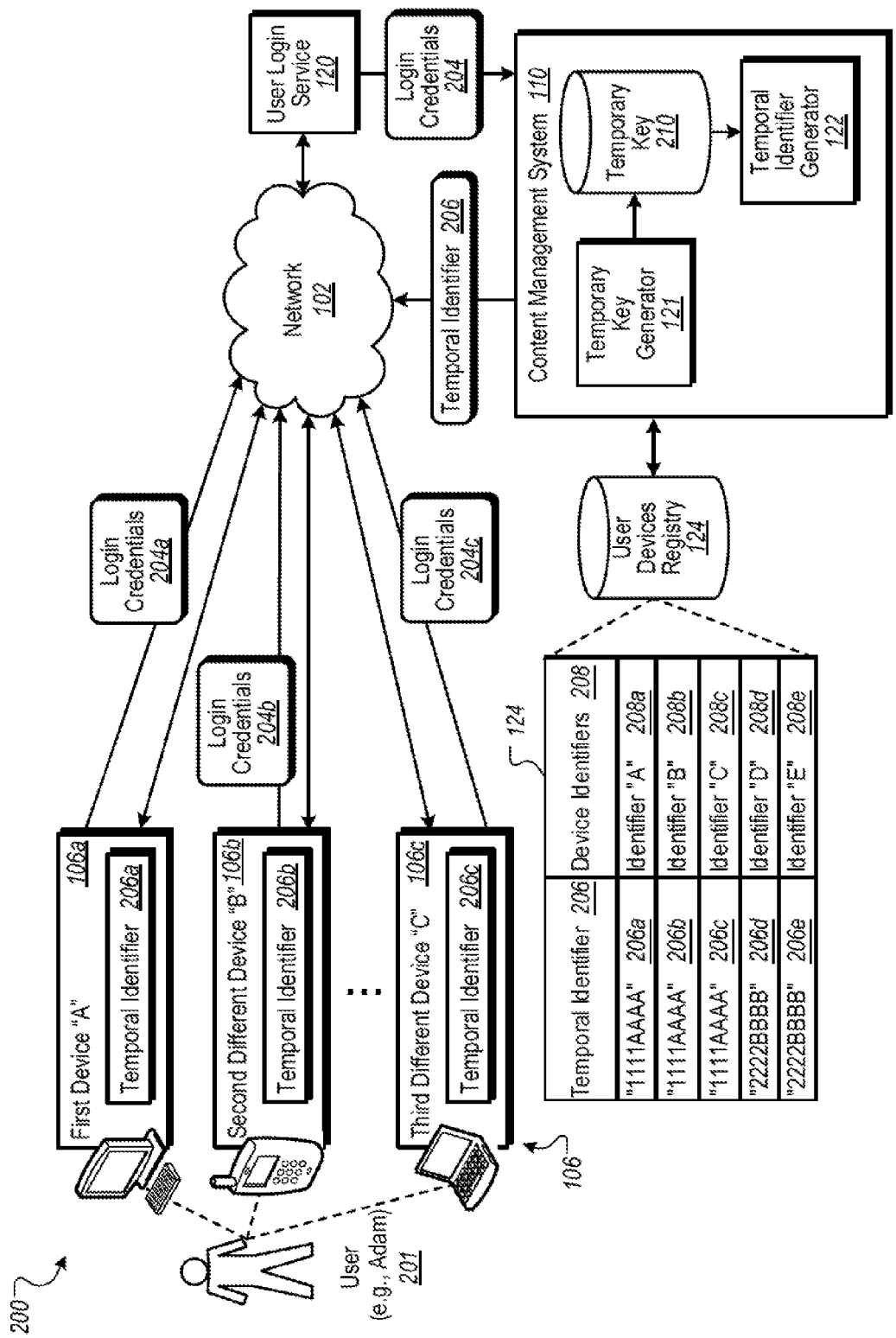
FIGS. 2A and 2B collectively show an example of a system for linking user devices.
Figure 2B:
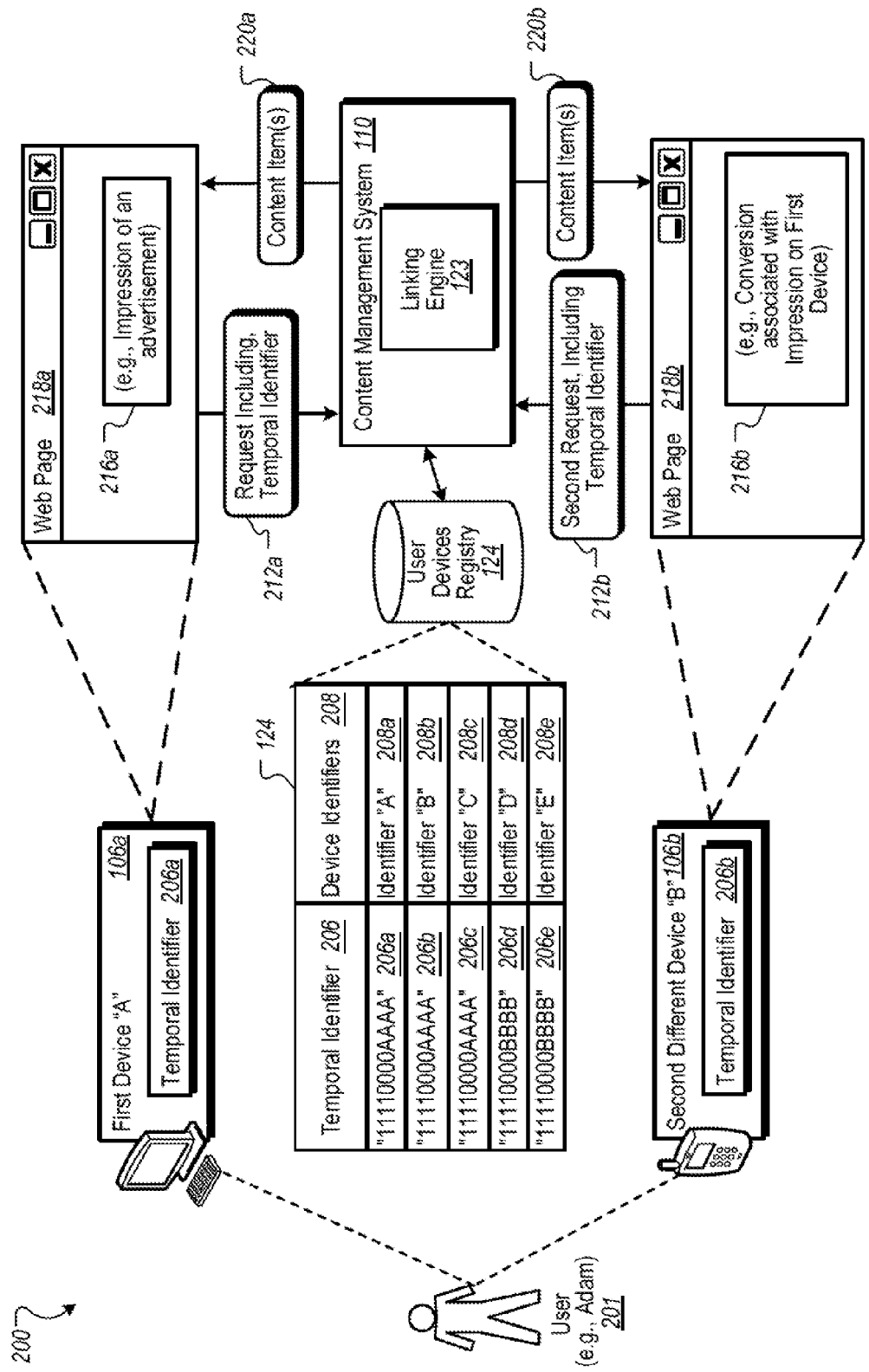

FIGS. 2A and 2B collectively show an example of a system 200 for linking user devices 106. For example, the user devices 106 used by a user 201 (e.g., Adam) may include a first device 106a (e.g., Adam's home PC), a second different device 106b (e.g., a mobile computing device such as Adam's smartphone), a third different device 106c (e.g., Adam's work laptop computer), and/or other user devices 106. In some implementations, based on information about the linked devices, the system 200 can be used for conversion tracking across the user devices 106. For example, a conversion by Adam may be tracked on the second different device 106b after content is provided to Adam on the first device 106a. Information about linked devices can also be used for other purposes, including, for example, frequency capping, content selection, merging/migrating profiles, and other purposes. In frequency capping, for example, impressions can be capped for a particular user using the linking information, e.g., to consider all of a user's linked devices when capping the impressions of content provided to that user. In an example related to content selection, content that is served, e.g., by the content management system 110, to any one of the user devices 106 associated with Adam can depend on information (e.g., interests, etc.) for Adam from other user devices 106 that are linked and associated with Adam. In an example of using linking information for merging/migrating profiles, the content management system 110 can combine Adam's profile information associated with devices 106a and 106b (e.g., for a combined profile), or populate or update profile information on a new device associated with Adam. For example, each of Adam's linked devices 106a-106c can inherit profile information from other linked device(s).

In some implementations, the system 200 can use different phases for creating the linking information and subsequently using the linking information. For example, FIG. 2A depicts example events that can be part of a creation phase, e.g., in which temporal identifiers used in the system 200 are created by the content management system 110 and stored on user devices 106. FIG. 2B depicts example events that can be part of a usage phase, e.g., in which the temporal identifiers are used, including using the linking to respond to a request from a user device 106 or to perform some other action. During the creation phase, users need not perform any specific content-related actions in order to be registered. For example, logging into the user login service 120 is sufficient for registering the user 201 by way of assigning a temporal identifier 206. Creation phases are user-specific and can cover a period of time. As such, a creation phased associated with user Adam can typically cover a different time period as a creation phase associated with a different user Betty.

Registering the user 201 in association with multiple devices can occur throughout the creation phase. For example, the third different device 106c can be registered when the user 201 logs into the user login service 120 using login credentials 204c. Similarly, other user devices 106 associated with the user 201 can be registered during the same creation phase. In some implementations, the creation phase can last a predetermined period of time (e.g., a set number of hours or days). In some implementations, the creation phase can end, for example, after a predetermined time has elapsed since the last registration for a given user has occurred.

Referring to FIG. 2A, the content management system 110 can register the user 201 in association with the first device 106a. Registering the user 201 can include creating the temporal identifier 206 based at least in part on the login credentials 204 (e.g., the login credentials 204a provided by the user 201) and a temporary key 210 (e.g., ephemeral key). For example, the content management system 110 can create the temporal identifier 206 and provide the temporal identifier 206 to the first device 106a for storage on that device.

In some implementations, registration can occur, for example, after the content management system 110 receives the login credentials 204 associated with the user 201. For example, the user 201 may be using the first device 106a to log into the network 102 using the user login service 120. In this example, the content management system 110 can create the temporal identifier 206a for storage on the first device 106a. To create the temporal identifier 206a, for example, the content management system 110 can use information from the login credentials 204a and the generated temporary key 210 (e.g., ephemeral key). For example, the temporal identifier 206a can be generated using a combination of a hashed version of a user identifier for the user and the temporary key 210. In some implementations, the temporal identifier 206a, although stored on the first device 106a, is not stored at this time on the content management system 110.

In some implementations, the user 201 (e.g., Adam) can log into the user login service 120 using the first device 106a (e.g., Adam's home PC) using login credentials 204a that can include, for example, a user login identifier that identifies Adam to the user login service 120. For example, the user login identifier can include Adam's login ID (e.g., Adam Jones) or other login credentials that are included in a login request that is received by the user login service 120. In some implementations, a login request can include or be associated with an anonymous identifier (e.g., in a cookie, a browser cookie, etc.) that is associated with the first device 106a. Anonymous identifiers can be used, for example, to avoid storing personally identifiable information that may include a login identifier associated with the user, the user's email address, the user's phone number, and so on. In some implementations, encryption can be used to facilitate the generation of identifiers, keys and/or other data elements used in linking devices.

In some implementations, the temporary key 210 can be a random key that is generated, for example, by the content management system 110. In some implementations, once the creation phase ends, the temporary key 210 can be irrevocably destroyed, which can prevent the subsequent reproduction of the temporal identifier 206. As such, destruction of the temporary key 210 prevents registration of other devices within the current phase.

In some implementations, the temporary key 210 can have a predetermined expiration. Registering a user (including initially and subsequently) can include determining whether the predetermined expiration has occurred. When the temporary key 210 is determined not to be expired, the content management system 110 can re-create the temporal identifier 206 using the login credentials 204 and the temporary key 210. In some implementations, expiration of the temporary key 210 can signal an end to the creation phase (associated with a user and associated devices). In some implementations, expiration of the temporary key 210 can be facilitated using timestamps. For example, when a timestamp is too old, it can be used to invalidate or expire the temporary key 210.

In some implementations, the temporal identifier can include an anonymous identifier (e.g., a tinyhash) that can be used for differentiating multiple users of a shared device. For example, the anonymous identifier can be unique to a particular one of the multiple users. In some implementations, the tinyhash can be a 16-bit one-way hash of a user identifier used to log into the user login service 120. Other mechanisms can also be used so that the tinyhash is unique to each user yet can also prevent the reverse identification of the user identifier. The tinyhash can also prevent collisions (e.g., duplicate temporal identifiers 206 for more than one user) on devices that are shared by a small number of users. Further, detecting that there is a large number of different tinyhashes associated with the same device can signal that the device is a highly-shared and/or public device. This information can be used, for example, to filter groups (e.g., graphs) that represent devices that are linked and/or other relationships.

In some implementations, the tinyhash can be large enough, for example, to distinguish a small number of users using the same device while being small enough, for example, to prevent the identification of users in a large collection of devices. The tinyhash can be used to differentiate a small number of users sharing a device (e.g., each user can have a different tinyhash). Tinyhashes can also be used to detect public devices. For example, if too many tinyhashes exist on one device, then the device may be assumed to be public. Tinyhashes can be used to define different groups of devices, e.g., when the tinyhashes are used during member graph traversal.

In some implementations, the temporal identifier can be computed using a hash function of a user identifier or some other suitable identifier included in or associated with the user's login credentials. For example, a temporal identifier $X_i$ for a given time interval i can be given by:

$$X_i = h(G, E_i) \quad (1)$$

where G is a user identifier (e.g., a login identifier), $E_i$ is the temporary key 210 or some other ephemeral key that is valid for the time interval i, and $h(G, E_i)$ is a hash function of the user identifier G that uses $E_i$ as a salt value. As $E_i$ changes over time, so does the value of $X_i$.

Subsequent to the registration of the user 201 in association with the first device 106a, the content management system 110 can register the same user 201 in association with a second different device 106b. This registration can include regenerating the temporal identifier 206 for user. Each time that the content management system 110 generates/re-generates the temporal identifier 206, for example, while the temporary key 210 is not expired and remains unchanged, the temporal identifier 206 that is generated is the same as before. For example, if registration of the user 201 in association with the second different device 106b occurs within a short time frame since the registration of the user 201 in association with the first device 106a, then the temporal identifiers 206 are the same. Specifically, the temporal identifier 206a that is stored on the first device 106a matches the temporal identifier 206b generated in this subsequent registration and provided for storage on the second different device 106b. The fact that the temporal identifiers 206a and 206b match is what is relied upon in the usage phase to link the devices 106a and 106b.

At this time, during the creation phase, even though the user 201 is registered in association with devices 106a and 106b, the temporal identifiers 206a and 206b may not yet be stored in the user devices registry 124. This can occur, for example, during the usage phase described below with reference to FIG. 2B.

Referring now to FIG. 2B, a description follows of example events that can be part of the usage phase, e.g., in which the temporal identifiers are used to link devices and for other purposes. For example, the usage phase can include linking the temporal identifiers and using the linking to respond to a request from a user device 106 or to perform some other action. In some implementations, the linking can be used to track a conversion on one device that is associated with presenting content on another device. For example, after an advertisement is presented to the user 201 (e.g., Adam) on the first device 106a, the linking can be used to track a conversion by Adam on the second different device 106b. The conversion can be, for example, some user action performed by Adam, such as making a purchase of the advertised product, navigating to a landing page associated with the advertisement, completing a registration, or some other user action that constitutes a conversion.

In the usage phase, for example, the content management system 110 can receive a request from one of the user devices 106 and that includes a temporal identifier. For example, the content management system 110 can receive a request 212a from the first device 106a. The request 212a, for example, can be a request for content, such as a request for an advertisement to fill an advertisement slot 216a, or a request for some other type of content. The request 212a can include the temporal identifier 206a associated with Adam that was stored on the first device 106a during the creation phase. In response to the request 212a, the content management system 110 can provide content item(s) 220a, e.g., an advertisement matching the request (e.g., a camera advertisement).

As part of linking the first device 106a and subsequent user devices associated with Adam in the current creation phase, the content management system 110 can store the temporal identifier 206a with a device identifier 208a associated with the first device 106a that generated the request 212a. In some implementations, the temporal identifier 206a and the device identifier 208a can be stored (e.g., in a row) in the user devices registry 124. In the current example, the linking of devices 106a and 106b has yet to occur, as there is just one entry in the user devices registry 124 that includes the temporal identifier 206a that corresponds to a group of logins by Adam in the current creation phase.

Subsequently, e.g., within a few minutes to a few days, the content management system 110 can receive a request 212b from the second different device 106b. The request 212b can include the temporal identifier 206b, which is identical to the temporal identifier 206a. This request 212b may occur, for example, when Adam is using his smartphone to follow up, e.g., to act upon the advertisement seen earlier on the first device 106a. For example, the request 212b can be a request for a product purchase web site associated with the advertised camera.

The first device and the second different device are linked using the temporal identifier and, in this example, in response to the second request. For example, the linking of the devices 106a and 106b can occur because entries for those devices in the user devices registry 124 have the matching temporal identifier 206a and 206b. As additional requests other than requests 212a and 212b are received from other registered devices associated with Adam, the content management system 110 can also link those devices, e.g., by storing and linking additional entries in the user devices registry 124.

Other user devices may be linked as well using the user devices registry 124. For example, the user devices registry 124 can include an entry (or be included in the indexed entry) for another one of Adam's user devices 106, e.g., identified by device identifier 208c (e.g., "C") and having a temporal identifier 206c. In another example, two of User Betty's user devices 106 can be linked in the user devices registry 124 using entries that include temporal identifiers 206d-206e and device identifiers 208d-208e. In these examples, devices are only linked if the temporal identifiers 206 match other entries.

The linking is used to respond to the second request or to perform another action. For example, based on the linking, the content management system 110 can use the information about the linked devices 106a and 106b in some way. In the example associated with conversion tracking, the content management system 110 can indicate that a conversion has occurred for Adam, e.g., if the request 212b is associated with a conversion associated with the request 212a. For example, the request 212b can be associated with a camera-related web page for making a purchase of the advertised camera, navigating to a landing page associated with the advertised camera, or completing a registration on a web page associated with the camera.

In some implementations, a graph can be used to represent linked devices. For example, each vertex in the graph can represent a specific device, and each edge in the graph can represent a connection between two connected vertices. In some implementations, an edge can be labeled with a tinyhash associated with the user for which the devices are linked.

Figure 2C:
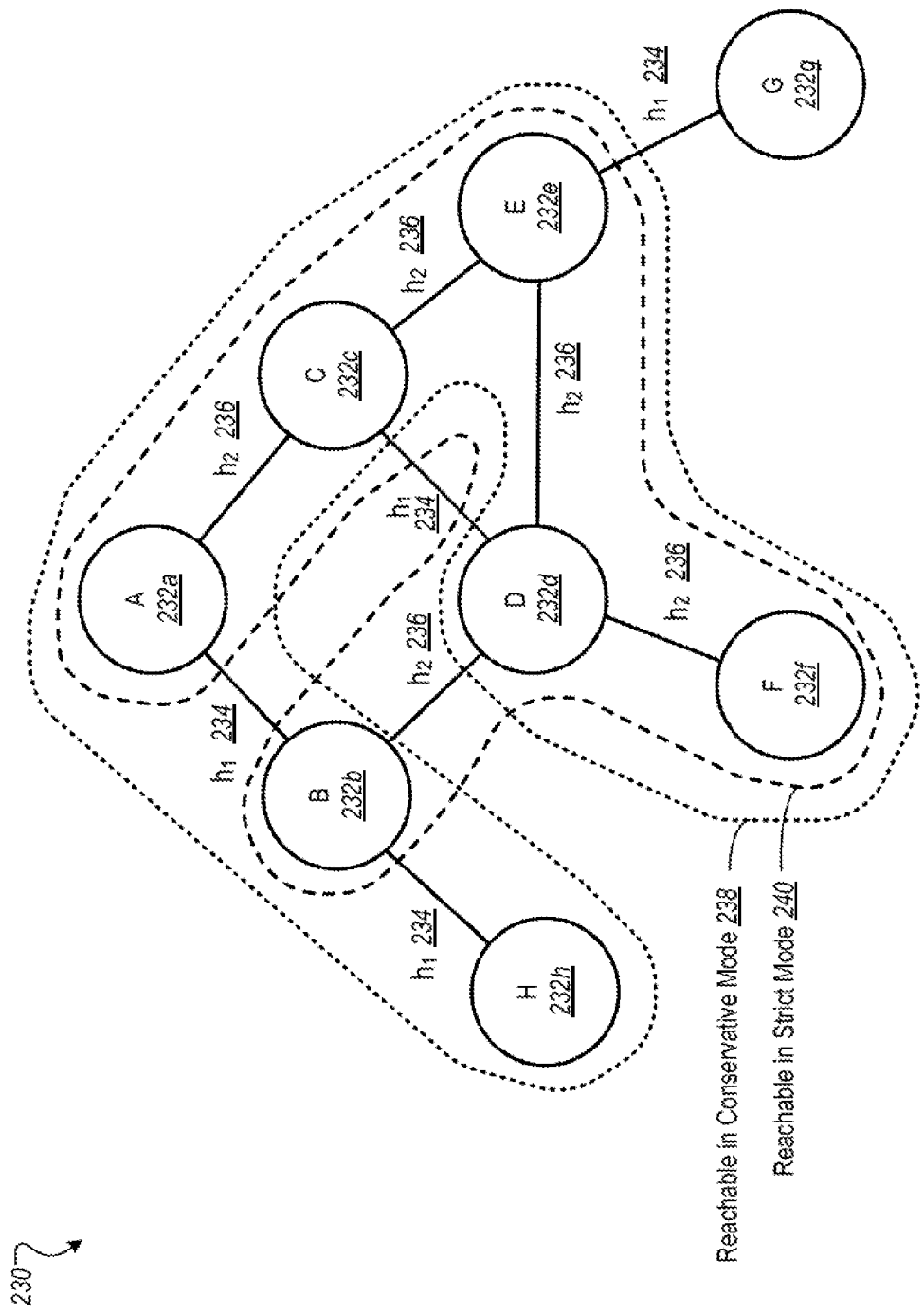
FIG. 2C shows an example graph that represents linked devices.

FIG. 2C shows an example graph 230 (e.g., a jumble member graph) that represents linked devices 232a-232h. For example, when a link is discovered between two devices, a tinyhash of the user can be recorded along with the link. The graph 230 includes edges 232 and 234 annotated by tinyhashes $234h_1$ and tinyhashes $236h_2$. For example, if users U1 and U2 share devices A and B, it is possible to form two links between A and B, one annotated by a tinyhash for U1, and the other by a tinyhash for U2. This can allow different views of membership by considering tinyhashes during traversal of the graph. For example, groups can be identified starting from member A (e.g., represented by node 232a) in one of the following modes or in other ways.

In a first (e.g., strict) mode 240, for example shown as a dotted line, traversing the graph can consider only a single tinyhash (e.g., $h_2$ depicted). Discovery of devices can follow edges annotated with tinyhash $h_2$. For example, conceptually, this is equivalent to: "We know who the user is ($h_2$), and we only want devices we know that user has used."

In a second (e.g., conservative) mode 238, for example shown as a dashed line, traversing the graph 230 can consider any path that has a consistent tinyhash, but it can be any tinyhash. This can include strict mode 240 devices (e.g., all devices reachable by following edges annotated with $h_2$), but it can also include all devices that can be found by traversing $h_1$. This is similar to the strict mode 240, except there is no assumption about who the current user is (e.g., the user can be either $h_1$ or $h_2$).

In a third (e.g., an aggressive) mode (e.g., the entire graph 230), tinyhashes can be ignored completely, and the graph can be traversed without respect to the user. For example, if a married couple shares a desktop computer, but both have exclusive use of their respective mobile devices, the two phones can be considered to be linked, even though neither of the couple has used the other's mobile device. In the graph 230, this would connect nodes 232a and 232g, based on following a path that includes both $h_1$ and $h_2$.

Figure 3A:
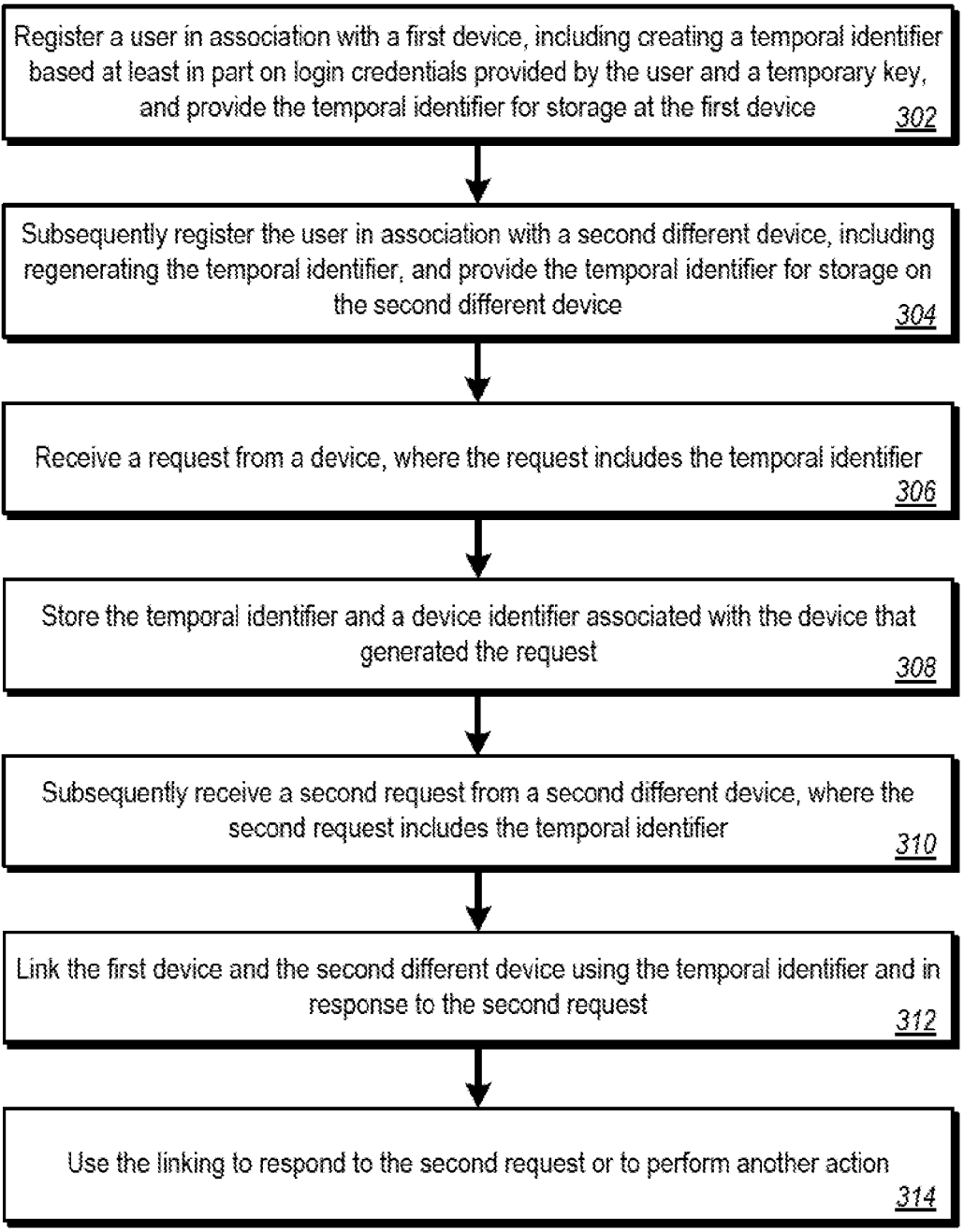
FIG. 3A is a flowchart of an example of a process for registering and linking devices associated with a user and using the linking to perform an action.

FIG. 3A is a flowchart of an example of a process 300 for registering and linking devices associated with a user and using the linking to perform an action. In some implementations, the content management system 110 and/or the user login service 120 can perform steps of the process 300 using instructions that are executed by one or more processors. FIGS. 1-2B are used to provide example structures for performing the steps of the process 300.

A user is registered in association with a first device, including creating a temporal identifier based at least in part on login credentials provided by the user and a temporary key (302). The temporal identifier is provided for storage at the first device. For example, referring to FIG. 2A, the content management system 110 registers the user 201 (e.g., Adam) in association with the first device 106a (e.g., Adams home PC). The content management system 110 can register Adam using information from Adam's login credentials 204a that Adam uses to log into the user login service 120. The registration can include generating the temporal identifier 206a using information from the login credentials 204a and the temporary key 210, as described above.

In some implementations, creating the temporal identifier includes creating the temporal identifier based at least in part on an identifier assigned to a user associated with the login credentials. For example, the temporal identifier generator 122 can generate the temporal identifier 206a using Adam's login ID or some other identifier associated with Adam that is used for logging into the user login service 120.

The user is subsequently registered in association with a second different device, including regenerating the temporal identifier (304). The temporal identifier is provided for storage on the second different device. As an example, the content management system 110 can register the same user Adam in association with the second different device 106b (e.g., Adam's smartphone). The subsequent registration includes the re-generation of the temporal identifier 206 for storage on the second different device 106b. In this way, the temporal identifiers 206a and 206b are identical, provided Adam has logged into the user login service 120 within the same creation phase, e.g., while the temporary key is still valid and unexpired. While the user Adam is registered in this way, the registration is actually anonymous, as the registration relies on the temporal identifier 206 and not any information that can be traced to Adam per se.

A request is received from a device, where the request includes the temporal identifier (306). For example, the content management system 110 can receive the request 212a from the first device 106a. The request 212a can include the temporal identifier 206a.

The temporal identifier is stored, and a device identifier associated with the device that generated the request is stored (308). For example, the content management system 110 can store the temporal identifier 206a and an identifier (e.g., "A") that uniquely identifies the first device 106a. In some implementations, storing the temporal identifier 206a can include storing the temporal identifier 206a and the device identifier (e.g., "A") in a data structure, e.g., the user devices registry 124, that is indexed by the temporal identifier. Other ways to store the information can be used.

A second request is subsequently received from a second different device, where the second request includes the temporal identifier (310). For example, the content management system 110 can receive the request 212b from the second different device 106b (e.g., Adam's smartphone). The request 212b can include the temporal identifier 206b that was stored on the second different device 106b (e.g., Adam's smartphone) during the creation phase.

The first device and the second different devices are linked using the temporal identifier and in response to the second request (312). For example, the content management system 110 can store the temporal identifier 206b and an identifier (e.g., "B") that uniquely identifies the second different device 106b. Storage of the information can be, for example, in the user devices registry 124. Devices 106a and 106b are now linked, for example, because entries for the temporal identifiers 206a and 206b are identical in the user devices registry 124 that include device identifiers 208a and 208b. Other user devices 106 (e.g., a third different device 106c) can also be linked if corresponding entries in the user devices registry 124 include temporal identifiers 206 that are identical to temporal identifiers 206a and 206b.

The linking is used to respond to the second request or to perform another action (314). For example, because the devices 106a and 106b are linked (e.g., associated with the user Adam), the content management system 110 can use the linking information in various ways. In some implementations, the content management system 110 can use the linking information for cross-device conversion tracking purposes. For example, the content management system 110 can use information about the request 212b, the content item 220b, and/or subsequent user actions to determine, for example, that a conversion associated with the content item 220a has occurred. In some implementations, the content management system 110 can use the linking information for frequency capping purposes. For example, the content management system 110 can select the content item 220b based on information about the number of times, if any, that the content item 220b has been provided to Adam. In some implementations, the content management system 110 can use the linking information for content selection. For example, the content item 220b can be selected, at least in part, for presentation on the second different device 106b using information about Adam (e.g., user preferences) that are available from the first device 106a.

Figure 3B:
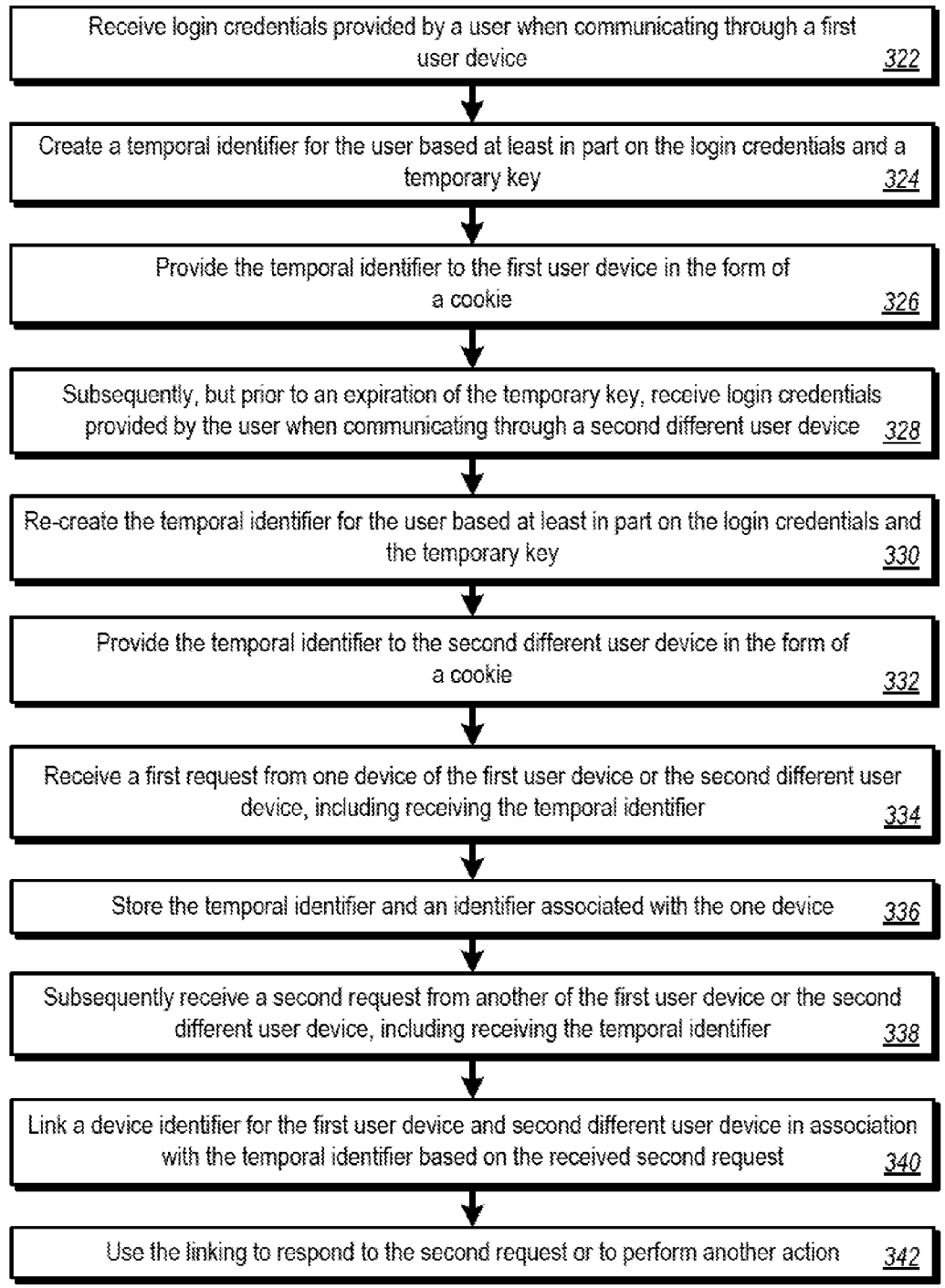
FIG. 3B is a flowchart of an example of a process for linking devices associated with a user and using the linking to perform an action.

FIG. 3B is a flowchart of an example of a process 320 for linking devices associated with a user and using the linking to perform an action. In some implementations, the content management system 110 and/or the user login service 120 can perform steps of the process 320 using instructions that are executed by one or more processors. FIGS. 1-2B are used to provide example structures for performing the steps of the process 320.

Login credentials are received (322). The login credentials are provided by a user when communicating through a first user device. For example, the content management system 110 can receive login credentials 204a provided by the user 201 (e.g., Adam) using the first device 106a. Adam can provide the login credentials 204a, for example, when logging into the user login service 120.

A temporal identifier is created for the user based at least in part on the received login credentials and a temporary key (324). As an example, the temporal identifier generator 122 can create the temporal identifier 206 using, for example, the received login credentials 204a and the temporary key 210. The temporary key generator 121, for example, can generate the temporary key 210.

The temporal identifier is provided to the first user device in the form of a cookie (326). The content management system 110, for example, can provide the temporal identifier 206a in the form of a cookie for storage on the first device 106a.

Subsequently, but prior to an expiration of the temporary key, login credentials that are provided by the user when communicating through a second different user device are received (328). For example, the content management system 110 can receive login credentials 204b provided by the user 201 (e.g., Adam) using the second different device 106b. The login credentials 204a can be provided by Adam, for example, when Adam logs into the user login service 120.

The temporal identifier is re-created for the user based at least in part on the login credentials and the temporary key (330). For example, the temporal identifier generator 122 can use the login credentials 204b and the temporary key 210 to re-create the same temporal identifier 206. For example, the value of the temporal identifier 206 is the same as that created in response to the received login credentials 204a provided by Adam using the first device 106a. The temporal identifier 206 is the same because the login credentials 204a and 204b are the same, and the calculated temporary key 210 is the same as before (e.g., from the same creation phase).

The temporal identifier is provided to the second different user device in the form of a cookie (332). For example, the content management system 110 can provide the temporal identifier 206b in the form of a cookie for storage on the second different device 106b.

A first request is received from one device of the first user device or the second different user device, including receiving the temporal identifier (334). As an example, the content management system 110 can receive the request 212a from the first device 106a or the request 212b from the second different device 106b. The request 212a can include the temporal identifier 206a or 206b, respectively. If other devices associated with Adam have also been registered during the current creation phase, the request received at this time can be received from one of those devices instead. In each of these examples, the temporal identifier 206 is the same.

The temporal identifier and an identifier associated with the one device are stored (336). As an example, the content management system 110 can store the temporal identifier 206a and an identifier (e.g., "A" that identifies the first device 106a) in the user devices registry 124.

Subsequently, a second request is received from another of the first user device or the second different user device, including receiving the temporal identifier (338). For example, the content management system 110 can receive the other one of the request 212b (or the request 212a), e.g., whichever one was not received at (334). The received request 212b (or request 212a) can include the temporal identifier 206b (or the temporal identifier 206a) that was stored on the second different device 106b (or the first device 106a) during the creation phase.

A device identifier for the first user device and second different user device are linked in association with the temporal identifier based on the received second request (340). For example, devices 106a and 106b are linked in the user devices registry 124 because the temporal identifiers 206a and 206b are identical in entries that include device identifiers 208a and 208b. Other user devices 106 (e.g., a third different device 106c) can also be linked if corresponding entries in the user devices registry 124 include temporal identifiers 206 that are identical to temporal identifiers 206a and 206b.

The linking is used to respond to the second request or to perform another action (342). For example, the linking information can be used to perform cross-device conversion tracking, cross-device frequency capping, or content selection as described above.

Figure 4:
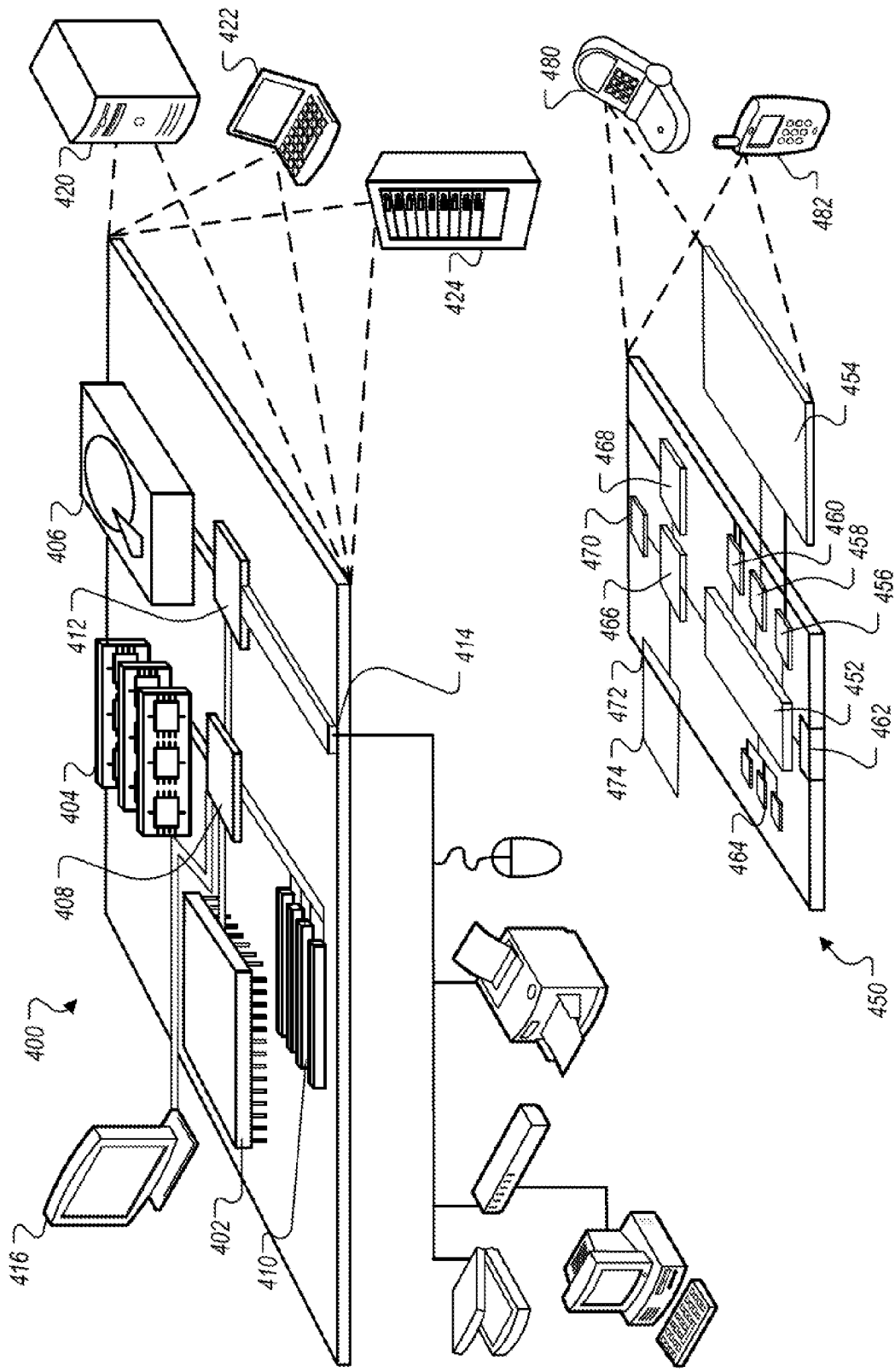
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   registering, by one or more servers, a first device with a given user including creating a first temporal identifier based at least in part on (i) a first instance of login credentials of the given user that were provided through the first device and (ii) a temporary key that is associated with the login credentials;
   providing, by the one or more servers, the first temporal identifier to the first device for storage at the first device;
   subsequently registering, by the one or more servers, a second different device with the given user including generating a second temporal identifier that matches the first temporal identifier based on (i) a second instance of the login credentials provided through the second different device and (ii) the temporary key that is associated with the login credentials;
   providing the second temporal identifier for storage on the second different device;
   determining, by the one or more servers, that the first temporal identifier matches the second temporal identifier;
   linking, in a data structure, and by the one or more servers, the first device and the second device as associated with a same user based on the determination that the first temporal identifier matches the second temporal identifier;
   associating interactions between the one or more servers and each of the first device and the second device with the given user based on the linking;
   determining, after the linking and in response to receipt of a third instance of the login credentials from a third device, that the temporary key used to generate the first temporal identifier and the second temporal identifier has expired; and
   generating, by the one or more servers, and in response to determining that the temporary key has expired, a different temporal identifier that does not match the first temporal identifier or the second temporal identifier based on a different temporary key and the login credentials.

2. The method of claim 1 wherein registering the first device with the given user further includes receiving the login credentials from the given user.

3. The method of claim 1 wherein the temporary key has a predetermined expiration, and wherein subsequently registering the second different device includes determining whether the predetermined expiration has occurred, and when not, recreating the first temporal identifier using the login credentials and the temporary key.

4. The method of claim 1 wherein creating the first temporal identifier includes creating the first temporal identifier based at least in part on an identifier assigned to the given user.

5. The method of claim 1 wherein storage on the first device is in a data structure that is indexed by the temporal identifier.

6. The method of claim 1 wherein only one of the first device or second different device is a mobile device.

7. The method of claim 1 further comprising using an association between the first temporal identifier and the second temporal identifier for one or more of cross-device conversion tracking, cross-device frequency capping, or content selection.

8. The method of claim 1 further comprising using an association between the first temporal identifier and the second temporal identifier to select content to deliver to the user in response to the second request.

9. The method of claim 1, wherein each of the first temporal identifier and the second temporal identifier includes an anonymous tinyhash for differentiating multiple users of a shared device, and wherein the anonymous tinyhash is unique to a particular one of the multiple users.

10. A computer program product embodied in a non-transitive computer-readable medium including instructions, that when executed, cause one or more processors to:
register, by one or more servers, a first device with a given user including creating a first temporal identifier based at least in part on (i) a first instance of login credentials of the given user that were provided through the first device and (ii) a temporary key that is associated with the login credentials;
provide the first temporal identifier to the first device for storage at the first device;
subsequently register, by the one or more servers, a second different device with the given user including generating a second temporal identifier that matches the first temporal identifier based on (i) a second instance of the login credentials provided through the second different device and (ii) the temporary key that is associated with the login credentials;
provide the second temporal identifier for storage on the second different device;
determine, by the one or more servers, that the first temporal identifier matches the second temporal identifier;
link, in a data structure and by the one or more servers, the first device and the second device as associated with a same user based on the determination that the first temporal identifier matches the second temporal identifier;
associate interactions between the one or more servers and each of the first device and the second device with the given user based on the linking;
determine, after the linking and in response to receipt of a third instance of the login credentials from a third device, that the temporary key used to generate the first temporal identifier and the second temporal identifier has expired; and
generate, by the one or more servers and in response to determining that the temporary key has expired, a different temporal identifier that does not match the first temporal identifier or the second temporal identifier based on a different temporary key and the login credentials.

11. The computer program product of claim 10 wherein registering the first device with the given user further includes receiving the login credentials from the given user.

12. The computer program product of claim 10 wherein the temporary key has a predetermined expiration, and wherein subsequently registering the second different device includes determining whether the predetermined expiration has occurred, and when not, recreating the first temporal identifier using the login credentials and the temporary key.

13. The computer program product of claim 10 wherein creating the first temporal identifier includes creating the first temporal identifier based at least in part on an identifier assigned to the given user.

14. The computer program product of claim 10 wherein storage on the first device is in a data structure that is indexed by the temporal identifier.

15. A system comprising:
one or more processors; and
one or more memory elements including instructions that, when executed, cause the one or more processors to:
register, by one or more servers, a first device with a given user including creating a first temporal identifier based at least in part on (i) a first instance of login credentials of the given user that were provided through the first device and (ii) a temporary key that is associated with the login credentials;
provide the first temporal identifier to the first device for storage at the first device;
subsequently register, by the one or more servers, a second different device with the given user including generating a second temporal identifier that matches the first temporal identifier based on (i) a second instance of the login credentials provided through the second different device and (ii) the temporary key that is associated with the login credentials;
provide the second temporal identifier for storage on the second different device;
determine, by the one or more servers, that the first temporal identifier matches the second temporal identifier;
link, in a data structure and by the one or more servers, the first device and the second device as associated with a same user based on the determination that the first temporal identifier matches the second temporal identifier;
associate interactions between the one or more servers and each of the first device and the second device with the given user based on the linking;
determine, after the linking and in response to receipt of a third instance of the login credentials from a third device, that the temporary key used to generate the first temporal identifier and the second temporal identifier has expired; and
generate, by the one or more servers and in response to determining that the temporary key has expired, a different temporal identifier that does not match the first temporal identifier or the second temporal identifier based on a different temporary key and the login credentials.

16. The system of claim 15 wherein registering the first device with the given user further includes receiving the login credentials from the given user.

17. The system of claim 15 wherein the temporary key has a predetermined expiration, and wherein subsequently registering the second different device includes determining whether the predetermined expiration has occurred, and when not, recreating the first temporal identifier using the login credentials and the temporary key.

18. The system of claim 15 wherein storage on the first device is in a data structure that is indexed by the temporal identifier.

* * * * *